(12) United States Patent
Clark et al.

(10) Patent No.: US 12,081,145 B2
(45) Date of Patent: Sep. 3, 2024

(54) TIME-DEPENDENT PLASMA SYSTEMS AND METHODS FOR THERMIONIC CONVERSION

(71) Applicant: Modern Hydrogen, Inc., Woodinville, WA (US)

(72) Inventors: Stephen E. Clark, Bellevue, WA (US); Roelof E. Groenewald, Bothell, WA (US); Arvind Kannan, Bellevue, WA (US); Andrew T. Koch, Seattle, WA (US); Hsin-I Lu, Mercer Island, WA (US); Alexander J. Pearse, Bothell, WA (US); Peter J. Scherpelz, Seattle, WA (US)

(73) Assignee: Modern Hydrogen, Inc., Woodinville, WA (US)

( * ) Notice: Subject to any disclaimer, the term of this patent is extended or adjusted under 35 U.S.C. 154(b) by 910 days.

(21) Appl. No.: 17/065,132

(22) Filed: Oct. 7, 2020

(65) Prior Publication Data

US 2021/0111011 A1    Apr. 15, 2021

Related U.S. Application Data

(60) Provisional application No. 62/912,637, filed on Oct. 9, 2019.

(51) Int. Cl.
*H02N 3/00*      (2006.01)
*H01J 17/06*    (2006.01)
(Continued)

(52) U.S. Cl.
CPC ............. *H02N 3/00* (2013.01); *H01J 17/063* (2013.01); *H01J 45/00* (2013.01); *H01J 17/54* (2013.01); *H05H 2242/00* (2013.01)

(58) Field of Classification Search
CPC .. H02N 3/00; H01J 17/54; H01J 45/00; H01J 17/063; H05H 1/24; H05H 2242/22
(Continued)

(56) References Cited

U.S. PATENT DOCUMENTS 3,022,430 A * 2/1962 Townsend ................ H02N 3/00
                                                          310/308
3,041,481 A    6/1962 Peters et al.
(Continued)

FOREIGN PATENT DOCUMENTS

CA         2544800          5/2005
CN        104501288         4/2015
(Continued)

OTHER PUBLICATIONS

Feb. 9, 2021 International Search Report issued on International Application No. PCT/US20/54750.
(Continued)

*Primary Examiner* — Alexander A Singh
(74) *Attorney, Agent, or Firm* — Perkins Coie LLP

(57) ABSTRACT

Various disclosed embodiments include thermionic energy converters and electronic circuitry for generating pulses for igniting plasma in a hermetic package of a thermionic energy converter. In various embodiments, an illustrative thermionic energy converter includes a hermetic package charged with a non-cesium gas additive. The hermetic package is configured to route into the hermetic package pulses for igniting plasma in the hermetic package. A cesium reservoir is disposed in the hermetic package. A cathode is disposed in the hermetic package and an anode is disposed in the hermetic package.

28 Claims, 12 Drawing Sheets

(51) Int. Cl.
*H01J 45/00* (2006.01)
*H01J 17/54* (2006.01)
(58) Field of Classification Search
USPC .......................................................... 310/306
See application file for complete search history.

(56) References Cited

U.S. PATENT DOCUMENTS

| | | | |
|---|---|---|---|
| 3,052,797 | A | 9/1962 | Kronenberg |
| 3,146,388 | A | 9/1964 | Rasor |
| 3,217,189 | A * | 11/1965 | Bloss .................. H01J 45/00 310/306 |
| 3,239,745 | A | 3/1966 | Hernqvist |
| 3,254,244 | A | 5/1966 | Milton et al. |
| 3,274,404 | A * | 9/1966 | Eichenbaum .......... H01J 45/00 310/306 |
| 3,278,768 | A | 10/1966 | Bernstein |
| 3,297,902 | A | 1/1967 | Beggs |
| 3,329,885 | A | 7/1967 | Gabor et al. |
| 3,388,293 | A | 6/1968 | Petschauer |
| 3,460,524 | A | 8/1969 | Lazaridis |
| 3,515,908 | A | 6/1970 | Caldwell |
| 3,673,440 | A | 6/1972 | Paine et al. |
| 3,694,260 | A | 9/1972 | Beggs |
| 3,702,408 | A | 11/1972 | Longsderff et al. |
| 3,740,592 | A | 6/1973 | Engdahl |
| 4,263,528 | A | 4/1981 | Miram |
| 4,361,781 | A | 11/1982 | Depp et al. |
| 4,373,142 | A | 2/1983 | Morris |
| 4,405,878 | A | 9/1983 | Oliver |
| 4,771,201 | A | 9/1988 | Free |
| 5,219,516 | A | 6/1993 | Horner-Richardson et al. |
| 6,037,691 | A | 3/2000 | Begg et al. |
| 6,181,049 | B1 | 1/2001 | Streckert et al. |
| 6,225,761 | B1 | 5/2001 | Dworsky |
| 6,987,027 | B2 | 1/2006 | Jin |
| 7,969,062 | B2 | 6/2011 | Hagg |
| 8,310,096 | B1 | 11/2012 | Drahota |
| 11,205,564 | B2 | 12/2021 | Clark et al. |
| 2003/0001490 | A1 | 1/2003 | Yamamoto |
| 2004/0261831 | A1 | 12/2004 | Tsuneoka et al. |
| 2005/0016576 | A1 | 1/2005 | Jiang et al. |
| 2005/0162104 | A1 | 7/2005 | Victor |
| 2005/0258729 | A1 | 11/2005 | Han |
| 2005/0285541 | A1 | 12/2005 | LeChevalier |
| 2007/0252507 | A1 | 11/2007 | Jeong |
| 2009/0153015 | A1 | 6/2009 | King |
| 2011/0148248 | A1 * | 6/2011 | Landa .................. H02N 11/002 310/306 |
| 2012/0299438 | A1 * | 11/2012 | Kimura .................. H01J 45/00 310/306 |
| 2013/0333749 | A1 | 12/2013 | Adriani |
| 2014/0306575 | A1 * | 10/2014 | Paxton .................. H01J 45/00 310/306 |
| 2015/0243867 | A1 | 8/2015 | Geballe et al. |
| 2015/0270089 | A1 | 9/2015 | Ghanea-Hercock |
| 2018/0294133 | A1 | 10/2018 | Busta |

FOREIGN PATENT DOCUMENTS

| | | |
|---|---|---|
| CN | 204421172 | 6/2015 |
| DE | 102004018631 | 11/2004 |
| EP | 0068111 | 11/1985 |
| JP | 0823688 | 1/1996 |
| RU | 2594279 | 8/2016 |
| WO | 2013152613 | 10/2013 |
| WO | 2020185613 | 9/2020 |

OTHER PUBLICATIONS

McDonald, "A Study of the possibility of transferring electricity in a thermionic energy converter by a electron attaching gas." Thesis, Department of Nuclear Engineering, University of Arizona (1966), pp. 2,8, 18-20, 27, 39, 52.

Rasor Associates, Inc., "Advanced Thermionic Energy Conversion: Progress Report", NSR 2-3, COO-2263-3, Sep. 1, 1974-Aug. 31, 1975, pp. 1-176.

N.S.Rasor, "Thermionic Energy Conversion Plasmas": IEEE Transactions on Plasma Science, vol. 19, No. 6, Dec. 1999, pp. 1191-1208.

Bernstein et al., "A New Approach to Thermionic Energy Conversion: Space Charge Neutralization by an Auxiliary Discharge," Proceedings of the Ire, 1932, 5 pages.

Keller et al., "The Possibility of Transfer of Electricity in a Thermionic Convertor by Negative Ions," Advanced Energy Conversion, vol. 7, 1967, 8 pages.

Oettinger et al., "Experiments with Enhanced Mode Thermionic Converters," IEEE Transactions on Plasma Science, vol. PS-6, No. 1, 1978, 6 pages.

Partial European Search Report for European Patent Application No. EP20875333.5, Applicant: Modern Electron, Inc., mailed Nov. 2, 2023, 19 pages.

Dick, R.S., "Thermionic Cogeneration Burner Assessment," Rasor Associates, Inc., Sunnyvale, California, 1984, 6 pages.

Kemenade, Erik van., "The Design of combustion heated thermionic energy converter," TU/e Eindhoven University of Technology, 1995, 172 pages.

Klepikov et al., "Design of TECTEM Prototype," https://doi.org/10.4271/929357, 1992.

Miskolezy et al., "Design and Economic Evaluation of Thermionic Cogeneration in Chlorine-Caustic Plant," Texas A7M University Libraries, https://oaktrust.library.tamu.edu/handle/1969, May 1985, 1 page.

Miskolozy et al., "Design and Construction of Thermionic Cogeneration Burner Module," Thermo Electron Corporation, Walthemm, MA., 1984, 5 pages.

Rasor Associates, Inc., "Thermionic Cogeneration Burner Assessment Study Performance Analysis Results," Topical Report—Energy Conservation, Office of Scientific and Technical Information, United States Department of Energy, Dec. 1983, 32 pages.

Baksht et al., "Thermionic Converters and Low-Temperature Plasma," Technical Information Center/U.S. Department of Energy, 1978, 92 pages.

* cited by examiner

TIME-DEPENDENT PLASMA SYSTEMS AND METHODS FOR THERMIONIC CONVERSION

RELATED APPLICATION

This patent application claims priority to U.S. Patent Application Ser. No. 62/912,637 filed Oct. 9, 2019 and entitled "Time-Dependent Plasma Systems and Methods For Thermionic Conversion," the entire contents of which are hereby incorporated by reference.

TECHNICAL FIELD

The present disclosure relates to thermionic energy conversion.

BACKGROUND

A challenge in the development of thermionic energy converters is to run thermionic energy converters at temperatures that are lower than temperatures that have been used in previous applications. For example, typical thermionic energy converters used in space applications employed hot side temperatures on the order of 1700 K and cold side temperatures around 900 K in order to supply enough thermal energy to effectively ionize cesium vapor in the gap to mitigate space charge.

In these previous systems, the efficiency of energy conversion increased as the hot side temperature increased because ionization became easier to achieve.

As is known, arc drop (that is, energy loss associated with cesium ionization) is proportional to $T_e$-$T_c$, where $T_e$ is the electron temperature entailed in sustaining a discharge and $T_c$ is the cathode temperature. Arc drop derives from plasma configuring itself to form a sheath near the electrodes in which the voltage drop across the sheath is sufficient to accelerate electrons away from the cathode with enough energy to impact cesium neutrals to create ionization events while also acting to keep the bulk of the plasma quasi-neutral. This sheath creates an accelerating field that pulls positive ions to the walls, which are balanced by ion production to maintain an arc.

As is also known, thermionic energy converters can operate at temperatures <1500 K, thereby helping to make them more useful. For instance, lower temperatures are more compatible with natural gas burners. However, such traditional modes of operation may have low efficiency. Thus, it may be desirable to improve energy converter efficiency at reduced hot side temperatures in order to enable integration into lower temperature systems.

If a energy converter uses a refractory metal emitter that depends on cesium vapor equilibrium to set its work function, then to reduce the operating temperature, maintain similar emission, and maintain optimal emitter work function and electron emission, then the cesium pressure also should be reduced. This reduction in cesium pressure increases the arc drop (that is, energy loss associated with cesium ionization). This increase in the arc drop results in a reduction in energy conversion efficiency that is due to cesium ion flux to the walls occurring faster than with higher cesium pressure—because the cesium ion-neutral collisions no longer limit the cesium ion flux to the electrodes.

Previous attempts have been made to use a pulsed noble gas (such as, for example, argon or xenon) plasma to mitigate space charge in thermionic energy converters. However, large active areas and currents led to difficulties in applying fast pulses to ionize the gas. For instance, previous attempts did not exceed a voltage $V_{pulse}$>20 V at times shorter than 1 µs. Prior experiments with pulsed noble gas energy converters also did not report integrating cesium into the systems.

SUMMARY

Various disclosed embodiments include thermionic energy converters and electronic circuitry for generating pulses for igniting plasma in a hermetic package of a thermionic energy converter.

In various embodiments, an illustrative thermionic energy converter includes a hermetic package charged with a non-cesium gas additive. A cesium reservoir is disposed in the hermetic package. The hermetic package is configured to route into the hermetic package pulses for igniting plasma in the hermetic package. A cathode is disposed in the hermetic package and an anode is disposed in the hermetic package.

In other embodiments, an illustrative thermionic energy converter includes a hermetic package charged with a non-cesium gas additive. A cesium reservoir is disposed in the hermetic package. A cathode is disposed in the hermetic package and an anode is disposed in the hermetic package. Electronic circuitry is configured to generate pulses for igniting plasma in the hermetic package.

In other embodiments, illustrative electronic circuitry is provided for generating pulses for igniting plasma in a hermetic package of a thermionic energy converter. A gate driver circuit is configured to generate a first gate driver signal and a second gate driver signal. At least one first metal-oxide-semiconductor field-effect transistor (MOSFET) has a gate, a source, and a drain, and the gate of the at least one first MOSFET is electrically coupled to receive the first gate driver signal. At least one second metal-oxide-semiconductor field-effect transistor (MOSFET) has a gate, a source, and a drain, and the gate of the at least one second MOSFET is electrically coupled to receive the second gate driver signal. A first capacitor is electrically connected between the drain of the at least one first MOSFET and a common ground, and a second capacitor is electrically connected between the source of the at least one second MOSFET and the common ground.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

DETAILED DESCRIPTION

Figure 1:
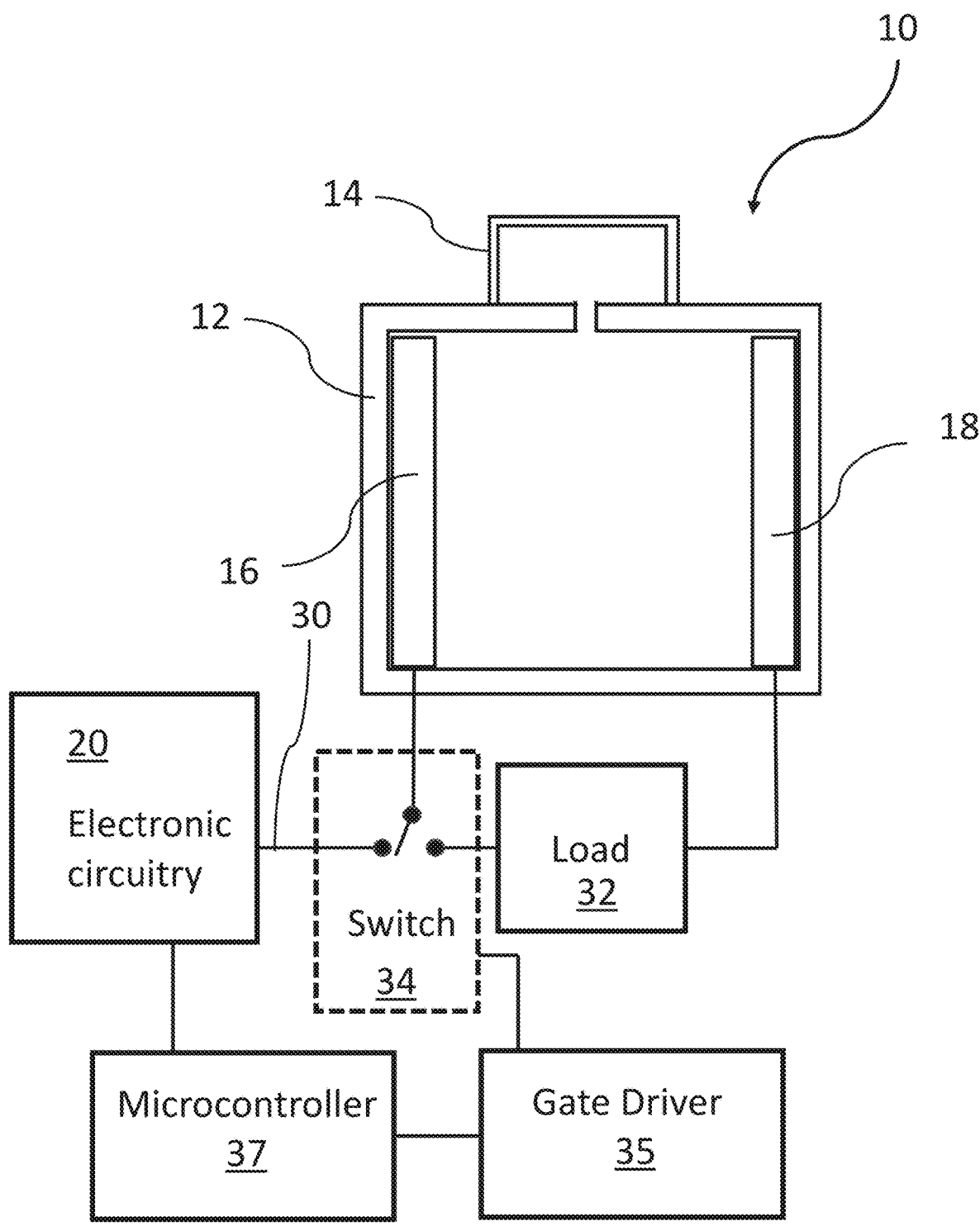
FIG. 1 is a block diagram of an illustrative thermionic energy converter with electronic circuitry configured to generate pulses for igniting plasma

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of overview, various disclosed embodiments include time-dependent plasma systems and methods for thermionic conversion. In various embodiments and by way of illustration only and not of limitation, space charge mitigation in a plasma-based thermionic energy converter system can be achieved at lower operating temperature than standard cesium-only based thermionics by use of a non-cesium gas additive, such as heavy noble gas additives (such as argon, xenon, or other noble gas or mixture of noble gases) or other gases, application of time-dependent pulsed waveforms, or a combination thereof.

It will be appreciated that in various embodiments inclusion of argon, xenon, or other noble gas or mixture of noble gases or other gases can help contribute to reducing cesium ion flux to the walls. It will also be appreciated that applying pulsed waveforms to ionize the cesium and/or the noble gas additives can help contribute to optimally ionizing the medium in the thermionic energy converter.

Now that an overview has been provided, illustrative details will be provided by non-limiting examples given by way of illustration only and not of limitation.

Referring now to FIG. 1, in various embodiments an illustrative thermionic energy converter 10 includes a hermetic package 12 charged with a non-cesium gas additive. A cesium reservoir 14 is disposed in the hermetic package 12. The hermetic package 12 is configured to route into the hermetic package 12 pulses for igniting plasma in the hermetic package 12. A cathode 16 is disposed in the hermetic package 12 and an anode 18 is disposed in the hermetic package 12. Electronic circuitry 20 is configured to generate pulses for igniting plasma in the hermetic package 12.

In various embodiments, the cathode 16 (sometimes referred to herein as an emitter) and the anode 18 (sometimes referred to herein as a collector) are housed in the hermetic package 12 (or assembly) that may be suitably sealed by a metal-ceramic-metal interface. Given by way of illustration only and not of limitation, a suitable metal-ceramic-metal interface is disclosed in U.S. Patent Application Ser. No. 62/830,027, the entire contents of which are hereby incorporated by reference.

It will be appreciated that, in various embodiments, the cathode 16 and the anode 18 may include several materials. For example and in various embodiments, the cathode 16 can include cesiated polycrystalline, single crystal or highly oriented molybdenum, tungsten, platinum, iridium, or nickel. These materials can be applied to super-alloy materials such as Inconel, Kanthal, or Haynes alloy or similar in order to work under flame operation. In various embodiments the cathode 16 may include a refractory metal cathode. It will be appreciated that, in such embodiments, use of refractory metal cathodes can help permit operation of the thermionic energy converter 10 at lower temperatures than previous thermionic energy converters and at cesium pressures less than around 1/10th that of previous generations of thermionic energy converters.

In various embodiments the cathode 16 can be a more complicated cathode, such as without limitation an impregnated barium dispenser cathode, a barium oxide cathode, a scandate cathode, or the like. It will be appreciated that in such embodiments the cathode 16 is an extremely high current density cathode. Use of such extremely high current density cathodes can help enable ultra-short pulses to ignite the plasma in a thermionic energy converter. It will also be appreciated that use of high pressures of an inert gas as a diffusion barrier (as an additional functionality) may also help enable coupling of a cesium-based chemistry on the anode 18 (collector) and a barium-based chemistry on the cathode 16 (emitter) (in the case of dispenser cathodes or scandate cathodes).

As another example and in various embodiments, the anode 18 is typically nickel. However, it will be appreciated that the anode 18 is not limited to nickel. To that end, in some embodiments the anode 18 can be copper, stainless steel, or a variety of other metal materials that support low work function operation in the presence of cesium with partial pressures ranging from 0.1 mtorr-20 torr and oxygen containing compounds such as pure $O_2$, $Cs_2O$, or other cesium oxide compounds in pressures ranging from $10^{-6}$-$10^{-2}$ torr.

In various embodiments the hermetic package 12 contains the cesium reservoir 14 and an oxygen source (not shown). In various embodiments the hermetic package 12 is pre-charged as desired with a non-cesium gas additive, such as heavy noble gas additives (such as argon, xenon, or other noble gas or mixture of noble gases) or other gases at a pressure of 0.1-100 torr at operating temperature. In some embodiments the noble gas may have gas properties that are selected to reduce electron-neutral scattering, cesium ion mobility, and/or heat conduction. In some embodiments the other gases may include a non-noble, molecular gas with gas properties that are selected to reduce electron-neutral scattering, cesium ion mobility, and/or heat conduction. In some such embodiments, the non-noble, molecular gas may include $SF6$, $XeF6$, or a mixture thereof.

In various embodiments, use of a mixed cesium vapor/noble gas chemistry means that high current density emitters such as, potentially, $LaB_6$, cesiated molybdenum, cesiated tungsten, cesiated platinum/iridium, barium dispenser, barium oxide, and scandate cathodes may be used at lower cesium vapor pressures. It will be appreciated that such lower cesium vapor pressure can help contribute to achieving a low collector work function at lower temperatures. This low work function is desirable to power production and efficiency of the thermionic energy converter 10.

It will be appreciated that addition of substantial pressures of a noble/non-cesium gas as well as enabling use of lower cesium pressures can also help contribute to providing improvements to the power output of the thermionic energy converter 10 through two additional mechanisms which work to decouple emitter chemistry from collector chemistry. First, in a cesium-only thermionic energy converter, the cesium pressures optimal for the emitter and plasma are often higher than optimal for the anode, which can result in a higher anode work function and a lower voltage output. By enabling lower cesium pressures, the anode work function can be more easily tuned to its minimum value in a pulsed thermionic energy converter. Second, presence of a moderate pressure of an inert gas can help to reduce evaporation of material from the emitter to the collector by forming a gas-phase diffusion barrier. This effect, in the parameter space described here, can help contribute to reducing evaporation rates by around one-to-two orders of magnitude. This reduction of evaporation rates can help reduce or seek to eliminate accumulation of emitter material—including work-function-raising contaminants such as barium—on the anode 18. This reduction of accumulation of emitter material can help keep output voltage of the energy converter at or near its optimal value. A reduction of emitter evaporation rate via gas additives can also help contribute to prolonging the useful operating lifetime of the thermionic energy converter 10 by delaying known failure modes such as (but not limited to): increasing optical emissivity (a large parasitic heat loss in any thermionic energy converter) over time due to film buildup on electrode surfaces; degradation of electrical conductivity due to accumulation of oxidized evaporation products on the collector; spurious power-consuming arcs from point defects in evaporated films; and electrical shorting due to reduction in the vacuum gap over time.

Figure 2:
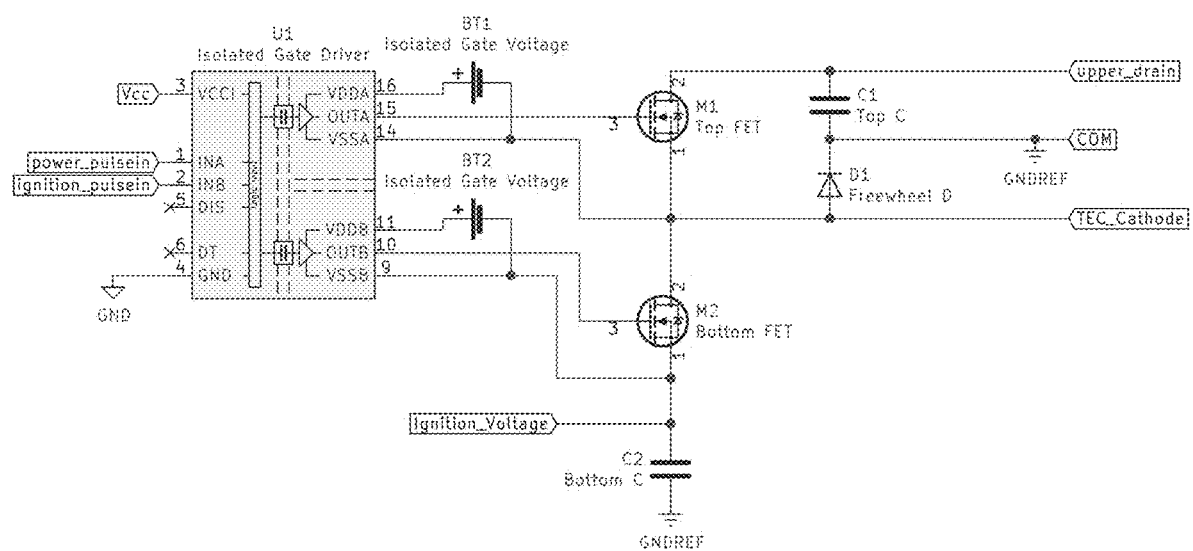
FIG. 2 is a schematic diagram of illustrative electronic circuitry for generating pulses for igniting plasma.

Referring additionally to FIG. 2, in various embodiments the electronic circuitry 20 includes switching power electronics that can be used to ignite the plasma and to route the output power of the thermionic energy converter 10 to a DC-DC conversion stage in order to achieve higher output voltage. One way to achieve this is via a half bridge. It will be appreciated that in various embodiments the electronic circuitry 20 is configured to generate pulses having pulse widths of less than 1 microsecond, 500 nanoseconds, 300 nanoseconds, 150 nanoseconds, or 100 nanoseconds, as desired for a particular application.

As shown in FIG. 2, in various embodiments the electronic circuitry 20 can include two n-channel enhancement mode metal-oxide-semiconductor field-effect transistors (MOSFETs) M1 (or Top FET) and M2 (or Bottom FET), an isolated (or non-isolated) gate driver U1, holdup capacitors C1 (or Top C) for smoothing the output to the DC-DC energy converter stage during pulse ignition, and charging capacitors C2 (or Bottom C) for supplying the energy entailed for plasma ignition. In various embodiments, a single MOSFET can be replaced by a bank of MOSFETS with sources, gates, and drains all connected in parallel, if desired, in order to reduce MOSFET on-state drain-source resistance at the expense of switching speed. Regardless, the MOSFET M1 or bank of MOSFETs M1 is referred to as an upper MOSFET and the MOSFET M2 or bank of MOSFETs M2 is referred to as a lower MOSFET.

The gate driver U1 receives digital control signals on power_pulsein and ignition_pulsein pins. These signals are supplied by a microcontroller 37 (FIGS. 1, 6A, and 6B; not shown in FIG. 2) that times turn-on and turn-off of the MOSFETs M1 and M2. Microcontrollers are well known and the microcontroller 37 may include any suitable controller as desired. It will be appreciated that in various embodiments the microcontroller 37 may use any of a variety of algorithms and employ any type of applicable hardware and software components as desired. It will be appreciated that the upper and lower MOSFETs M1 and M2 should not be activated simultaneously. The gate driver U1 drives the gates of the upper and lower MOSFETs M1 and M2.

The upper MOSFET M1 drain, connected to the upper_drain output, is used to connect the output of the thermionic energy converter 10 to a DC-DC energy converter stage (not shown) which increases the output voltage and lowers the current in order to make the output power of the thermionic energy converter 10 usable. The output of the upper MOSFET has a large amount of capacitance C1 (or Top C) to continue to feed the DC-DC energy converter current and voltage while the upper MOSFET M1 is turned off and the lower MOSFET M2 is supplying a pulse to the thermionic energy converter.

The lower MOSFET M2 is connected to the pulsed ignition capacitor bank C2 (or Bottom C) that is charged through the Ignition Voltage input connection to a negative voltage relative to GNDREF using a power supply (not shown). The capacitor bank C2 (or Bottom C) stores the energy for igniting the plasma or re-pulsing the plasma in the thermionic energy converter 10. The capacitor bank C2 (or Bottom C) smooths the draw of the power supply and allows for rapid discharge into the thermionic energy converter 10. The pulse ignition can range from −3 V to −500 V depending on parts selected and can support stringing several thermionic cells in series or parallel, or combinations thereof.

The DC-DC up conversion stage (not shown) is used to bring the raw output voltage of each thermionic energy converter 10 (which is on the order of 0.5 V) up to a usable voltage >5 V DC. Another inversion stage (not shown) can be used to turn the direct current (DC) into alternating current (AC) and to convert output voltage to 110-120 V or 208-240 V or another voltage output. If desired, this electrical power optionally can be further conditioned as desired. This electrical power also can be used to charge a battery and/or power other electronics and/or feed electricity into an electrical grid.

In order to be able to effectively pulse the thermionic energy converter 10, it is desirable that parasitic cabling capacitance and inductance be accounted for. This leads to designs which have short leads between the thermionic energy converter 10 and the half bridge pulsing board that are configured in a low inductance manner. These designs include using braided copper wires or flat copper planes that are next to each other to reduce parasitic inductance. Shorter pulses can be attained by, for example, using a transformer built into the thermionic energy converter 10 to mitigate cabling inductance by having higher voltage, lower current pulses delivered to the device that are then subsequently transformed into lower voltage higher current pulses with lower overall stray inductance limiting the pulse current rise and fall times. It will be appreciated that various embodiments will be able to route pulses having pulse widths of less than 1 microsecond, 500 nanoseconds, 300 nanoseconds, 150 nanoseconds, or 100 nanoseconds, as desired, with sufficiently low inductance so as to avoid significant power loss.

It will be appreciated that typical electronic components and printed circuit boards should be kept below around 100 C. As a result, these electronic components and printed circuit boards typically will be situated away from the hot side of the thermionic energy converter 10. In a combined heat and power (CHP) application, the electronic circuitry 20 can be situated near an air or water intake for the CHP unit—which also acts as a way to recover power electronics losses by preheating the air or water coming into the system.

It will be appreciated that wiring leads running into the power electronics should be thermally grounded to an air or water intake or another thermal sink in order to minimize heat flux entering the electronics and to maintain cool junction temperatures.

By way of illustration only and not of limitation, noble gas pressure is tuned to optimize power in a typical operating regime specified below. The pressure is set such that it limits diffusion of cesium outside the active area, suppresses evaporation of the cathode 16, and allows for ionization of cesium or argon/xenon/other gas/mixture thereof effectively while limiting ion flux to the electrodes (such as the cathode 16 and the anode 18).

Various embodiments of the energy converter operate with a hot side temperature between 1200-1700 K and a cold side temperature between 300-1000 K. The cesium reservoir 14 is set such that it has a pressure sufficient to lower the work function of the cathode 16 (emitter) and the anode 18 (collector).

In some embodiments, pulsing can be set to supply an ignition pulse that is very short (that is, less than or equal to 100 ns). When used in conjunction with a high current density cathode 16 (such as a barium dispenser cathode, a barium oxide cathode, a scandate cathode, or the like), such short pulsing can help contribute to improving overall efficiency of operation by reducing the time-averaged parasitic power drain associated with the ignition pulse. It will be appreciated that short pulsing can also help contribute to reducing degradation of the cathode 18 due to sputtering from ion bombardment during the ignition pulse—which has previously been recognized as a possible operational risk in published experiments with pulsed noble gas plasmas.

As mentioned above, the logic of sending pulses to ignite or reignite the plasma is controlled by the microcontroller 37. The microcontroller 37 monitors the system and supplies the digital control signals to the gate driver U1 on powerpulsein and ignitionpulsein pins to trigger switching of the MOSFETs M1 and M2 to achieve various goals as desired (such as maximize power output, maximize efficiency, modulate power output for demand response, and the like).

In various embodiments applying pulsed waveforms can include a "low-voltage" mode of pulsing in which only cesium is ionized and a "high-voltage" mode in which both cesium and the noble gas are ionized. In various embodiments that entail the "low-voltage" mode of pulsing, application of time-dependent pulsed waveforms can ignite plasma at a voltage that is sufficient to ignite cesium but that is insufficient to ignite heavy noble gas additives. In such embodiments, the heavy noble gas additives sustain the plasma such that the plasma does not have to be reignited with additional pulses. It will be appreciated that the "low voltage" mode of pulsing can help contribute to enhancing surface coverage of cesium on electrode surfaces by having cesium diffuse to the wall faster than it normally would in the absence of the applied voltage due to sheath potentials formed near the electrodes (that is, the cathode 16 and the anode 18). This pulsing can help improve emission characteristics of the emitting electrode (that is, the cathode 16).

In the "high-voltage" mode of pulsing, high voltages can be used to ionize the argon and/or xenon and/or other gas/mixture thereof. Thus, in the "high-voltage" mode of pulsing, both cesium and the noble gas are ionized.

Figure 3:
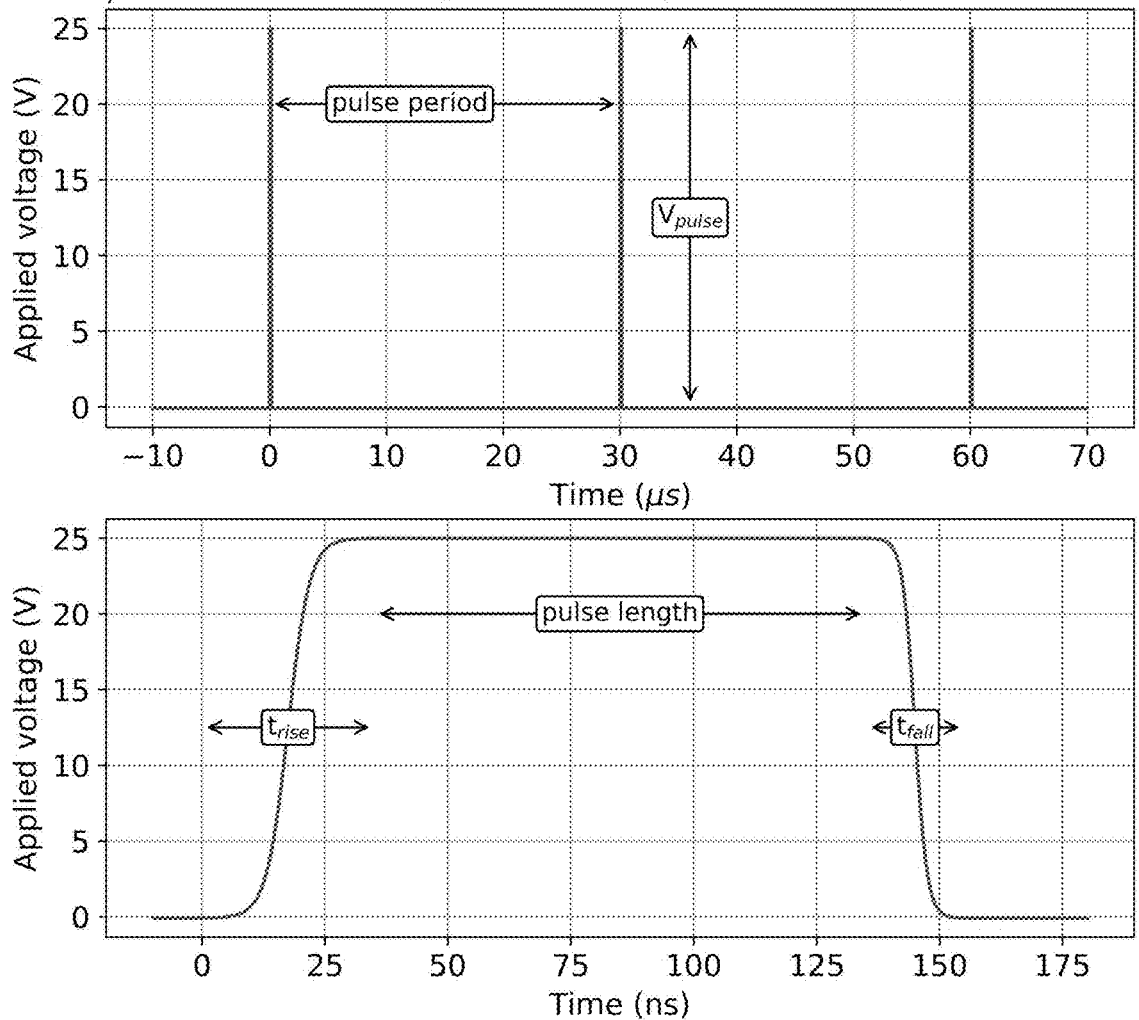
FIG. 3 is a graph of voltage versus time for an illustrative pulse.

It will be appreciated that ultra-fast pulses also can be used for pulse reignition only to ionize some of the neutrals (that is, atoms of either cesium or the non-cesium gas that have not yet been ionized and as such are still "neutral"— neither positive nor negative) to achieve partial space charge mitigation while helping to minimize pulsing losses. Referring additionally to FIG. 3, typical short pulse characteristics are given by way of illustration only and not of limitation. In some embodiments, illustrative short pulse characteristics can include $V_{pulse}$=25 V, pulse period=30 μs, and pulse length=100 ns. Such illustrative, non-limiting pulse characteristics can help enable high output power when operating in such a mode. The use of short, partially ionizing pulses was not recognized in the prior art as a route towards improved efficiency of pulsed noble gas thermionic energy converters. To that end, prior approaches focused entirely on pulse widths of several hundred nanoseconds or longer in order to fully neutralize the electron current, and thus required significant plasma lifetimes (exceeding 100 μs) in order to produce net power. Simulations using the particle-in-cell method (a well-known simulation method for simulating plasmas and electron clouds, in which charged particles are represented as lumped together macro-particles and the electric and magnetic fields are divided up into grid cells) demonstrate that a partially ionizing operation mode with short pulses may outperform currently known techniques in output power and efficiency—even with modest plasma lifetimes of only tens of μs.

Figure 4:
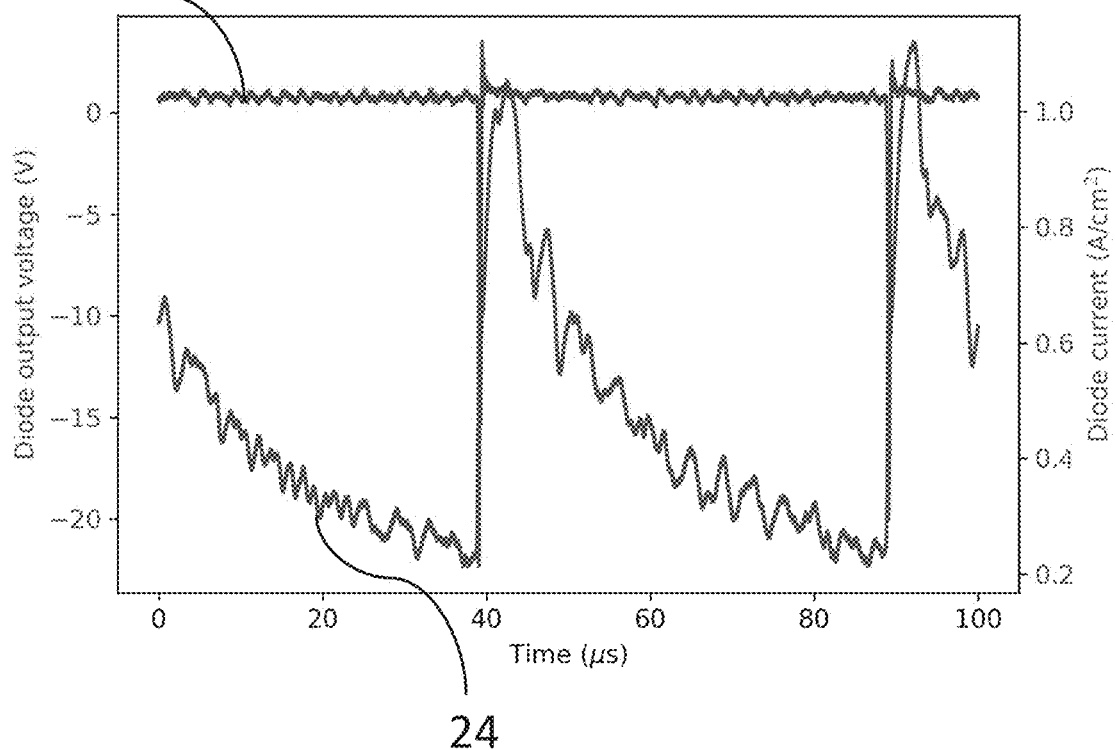
FIG. 4 is a graph of experimental energy converter output voltage versus time and experimental energy converter output current versus time.

Experiments validating the fast-pulse mode discussed above have been performed. Referring additionally to FIG. 4, thermionic energy converter current collected was enhanced as a result of an applied pulse used to rapidly create a dense plasma in the gap between electrodes. A pulse of around 20 V with a pulse length of around 300 ns and a pulse period of 50 μs was applied to a thermionic energy converter with 3 torr argon and a BaD cathode. As shown in FIG. 4, a plot 22 shows thermionic energy converter output voltage and a plot 24 shows thermionic energy converter current.

Figure 5:
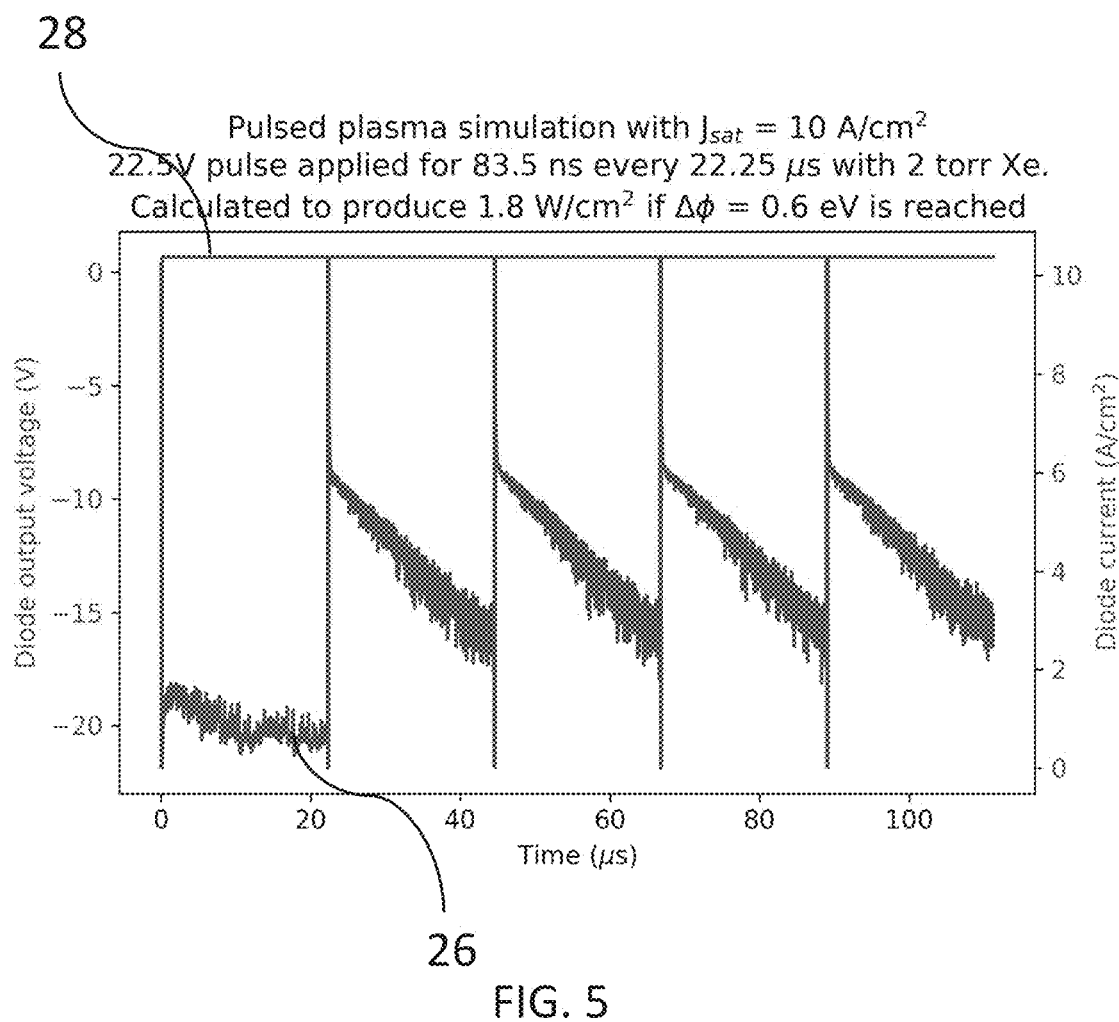
FIG. 5 is a graph of simulated thermionic energy converter output voltage versus time and simulated thermionic energy converter output current versus time.

Referring additionally to FIG. 5, simulations using the particle-in-cell method were used to explore wide ranges of pulse schemes (such as pulse length, applied voltage, and duty cycle) with different inert gas environments (such as argon or xenon) at various pressures. Simulated thermionic energy converter current is shown as a plot 26 and simulated thermionic energy converter output voltage is shown as a plot 28 when a short pulse (22.5 V with a pulse length of 83.5 ns and pulse period of 22.25 μs) is applied to a thermionic energy converter with a 0.75 mm gap loaded with 2 torr of xenon gas. As shown in FIG. 5, such a thermionic energy converter could produce an estimated 1.8 W/cm$^2$ in such a pulse mode if a work-function difference of 0.6 eV between the cathode and anode is maintained.

From the foregoing discussion it will be appreciated that mixing cesium vapor with noble gases (or other gases) may be desirable. First, such mixing may help contribute to improving ionization efficiency compared to a cesium-only thermionic energy converter—because scattering between the cesium ions and the neutral gas will limit cesium ion diffusion to the walls. Second, depending on the pulse voltage, the species of gas can be selectively ionized. That is, if pulsing between 5-10 V, cesium can be selectively ionized and the other gas can be used solely for diffusion limitation of the cesium ions. This allows lower voltage pulsing than previously proposed pulsed thermionic energy converters that incorporated noble gases—which in turn can help contribute to saving power and improving efficiency. It will be appreciated that this mode of operation can be extended into a self-sustaining struck mode (in which a plasma arc is maintained continuously due to ionization from electrons accelerated by the cathode sheath as described above).

However, it will be appreciated that pulsing also can be used to help improve ionization fraction and current flowing through the thermionic energy converter. Modulation of pulse parameters (voltage, pulse length, duty cycle, and the like) then can be used to modulate power output of a thermionic energy converter as well at nanosecond-to-microsecond to millisecond timescales.

In various embodiments, the pulsing signal 30 can be supplied to the cathode 16 or the anode 18. In some other embodiments, discussed further below, the pulsing signal 30 may be supplied to an additional electrode that is independent of the cathode 16 and the anode 18. Regardless, it will be appreciated that the pulsing signal 30 is generated exterior the hermetic package 12 and is routed into the hermetic package 12 to the appropriate electrode in any suitable, known manner.

Figure 6A:
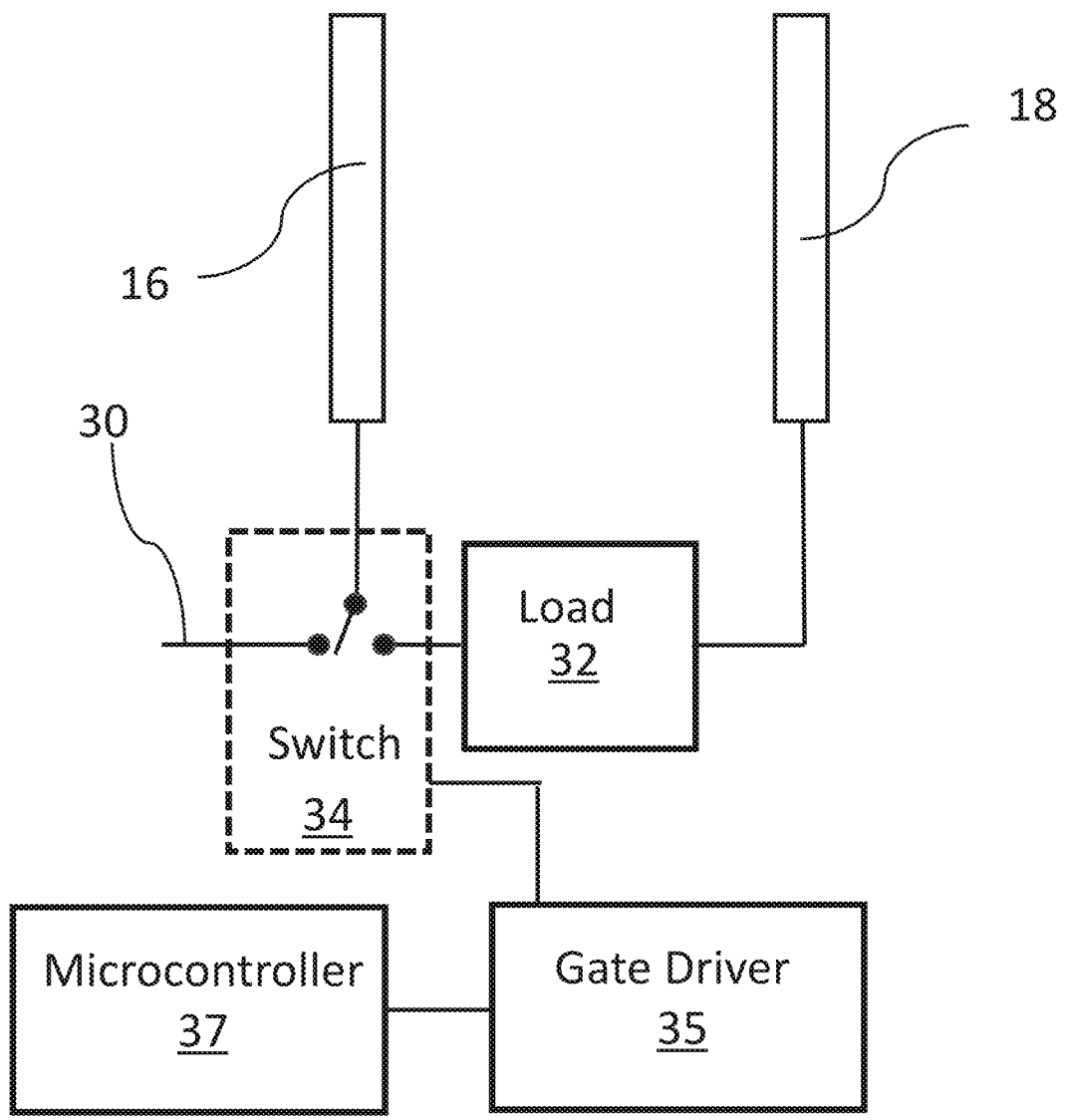
FIG. 6A is a block diagram of a cathode of the thermionic energy converter of FIG. 1 being switched between a pulsing signal and a load.

Referring additionally to FIG. 6A, in various embodiments the cathode 16 is switched between a pulsing signal 30 and a load 32 via a switch 34. The switch 34 suitably is a FET with a gate driven by a gate driver 35 and timing and logic controlled by the microcontroller 37. In some such embodiments the cathode 16 is switched between the pulsing signal 30 and the load 32 temporarily so that power can be collected from the thermionic energy converter 10 between the applied pulses 30.

Figure 6B:
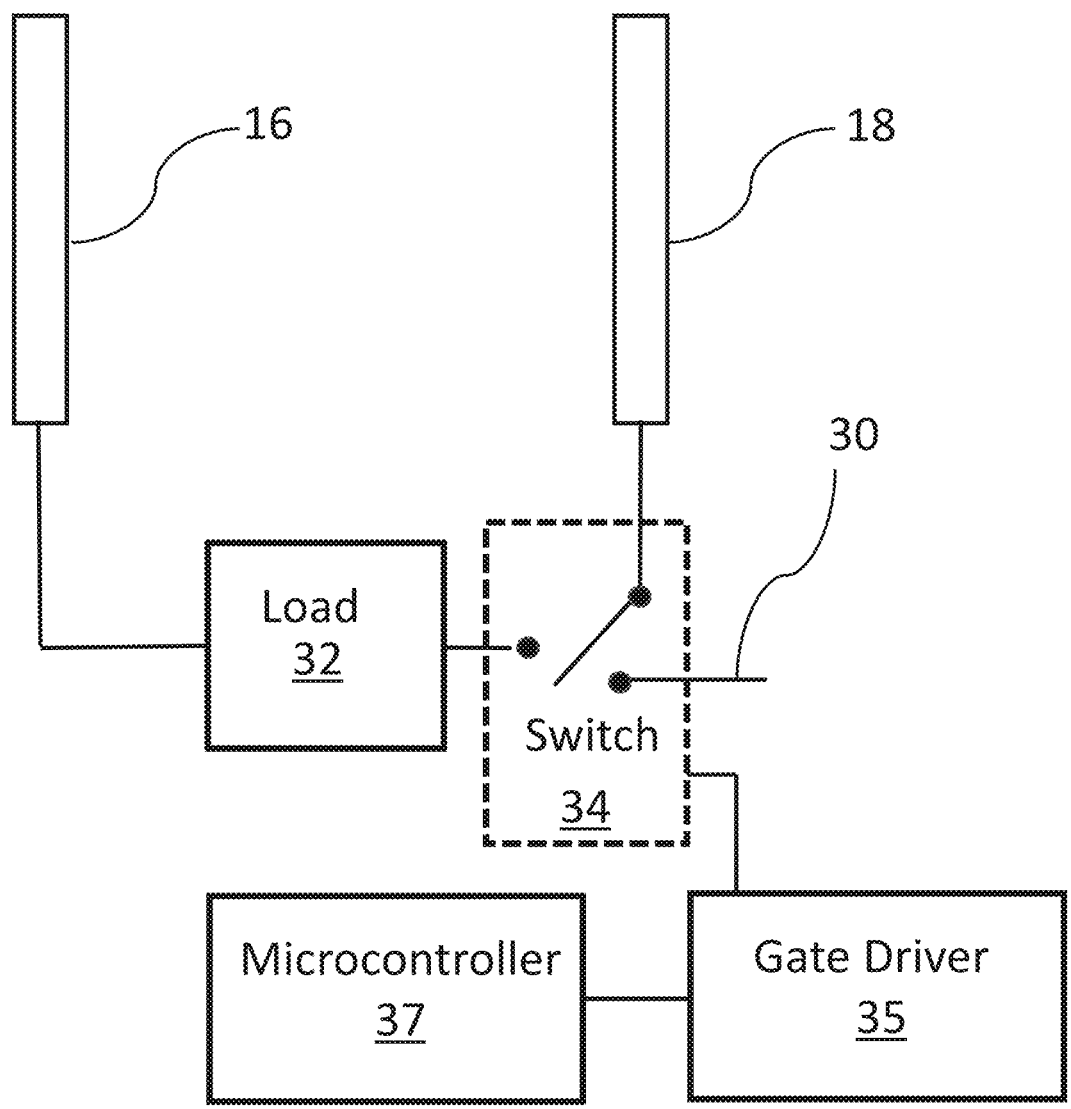
FIG. 6B is a block diagram of an anode of the thermionic energy converter of FIG. 1 being switched between a pulsing signal and a load.

Referring additionally to FIG. 6B, in various embodiments the anode 18 is switched between the pulsing signal 30 and the load 32 via the switch 34. As mentioned above, the switch 34 suitably is a FET with a gate driven by the gate driver 35 and timing and logic controlled by the microcontroller 37. In some such embodiments the anode 18 is switched between the pulsing signal 30 and the load 32 temporarily so that power can be collected from the thermionic energy converter between the applied pulses 30.

Referring additionally to FIGS. 7A-7E, in some other embodiments performance of the thermionic energy converters 10 described herein can be further improved by adding a third independent electrode 36 (sometimes referred to as an auxiliary electrode). In various embodiments the electrode 36 can be a separate electrode placed in a gap 38 between the cathode 16 and the anode 18, or an electrically isolated region of the cathode 16, or an electrically isolated region of the anode 18. By applying the pulsing signals 30 to the electrode 36, the thermionic energy converter 10 can be producing power throughout the pulsing period and not just in the time between pulses. This can help allow the thermionic energy converter 10 to operate at even higher efficiency and potentially much higher power densities.

Figure 7A:
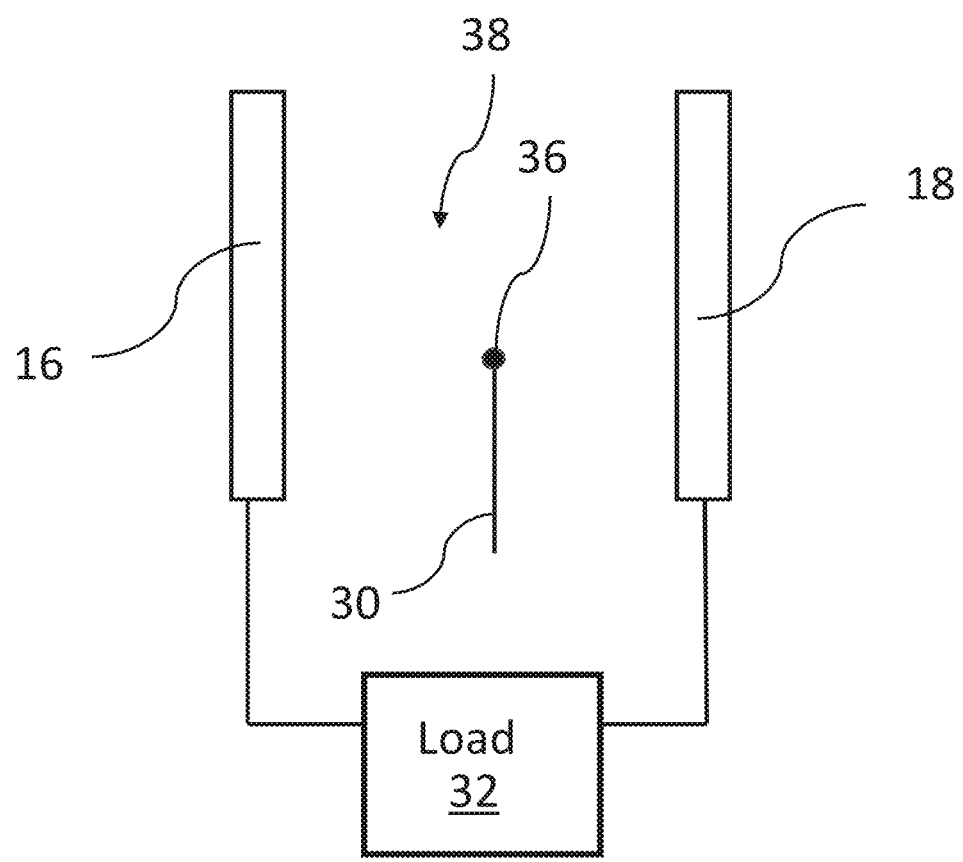
FIG. 7A is a block diagram of a pulse signal being applied to an electrode in a gap between a cathode and an anode of the thermionic energy converter of FIG. 1.

As shown in FIG. 7A, in some such embodiments the electrode 36 is a separate electrode independent of the cathode 16 or the anode 18 formed from a wire or pin or the like that is placed in the gap 38. The pulse signal 30 is applied to the electrode 36.

Figure 7B:
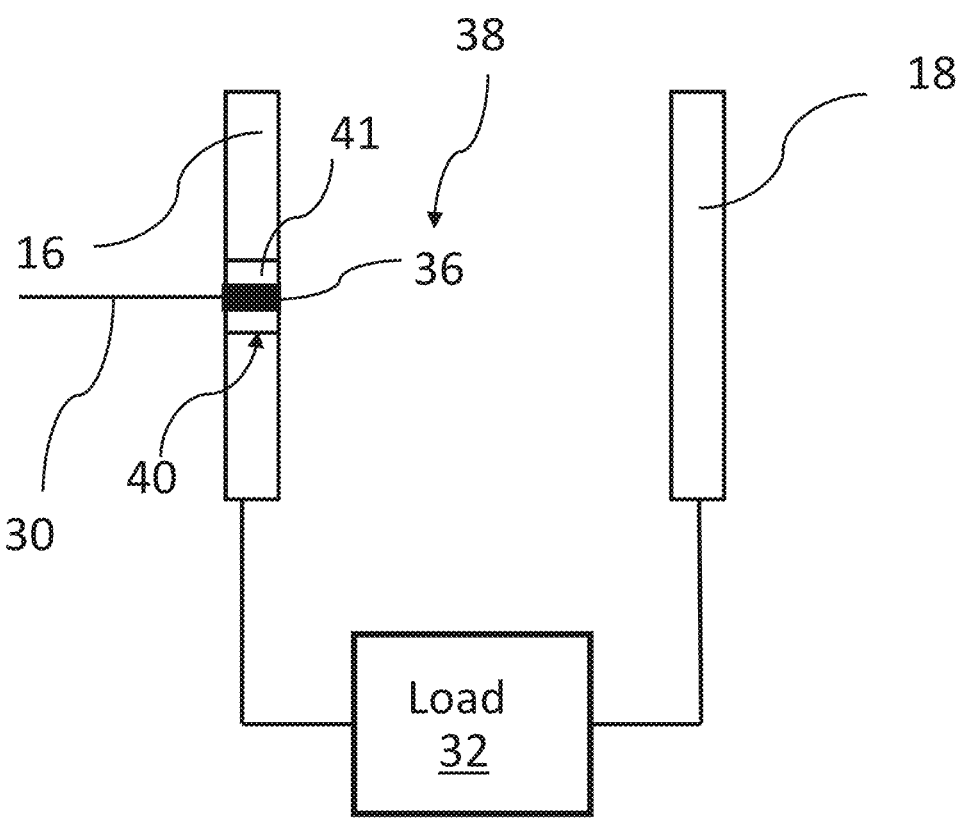
FIG. 7B is a block diagram of a pulse signal being applied to an electrically isolated region of a cathode of the thermionic energy converter of FIG. 1.

As shown in FIG. 7B, in some embodiments the electrode 36 is formed within an electrically isolated region 40 of the cathode 16. In the electrically isolated region 40 the electrode 36 is electrically isolated from the rest of the cathode 16 with an insulating material 41. In various embodiments the insulating material 41 may include, such as by way of example only, alumina, magnesium silicate, magnesium oxide, silicon carbide, silicon nitride, magnesium aluminum silicate, zirconium oxide, or the like, such that the electrode 36 is electrically isolated from the cathode 16. In such embodiments the pulse 30 is applied to the electrode 36.

Figure 7C:
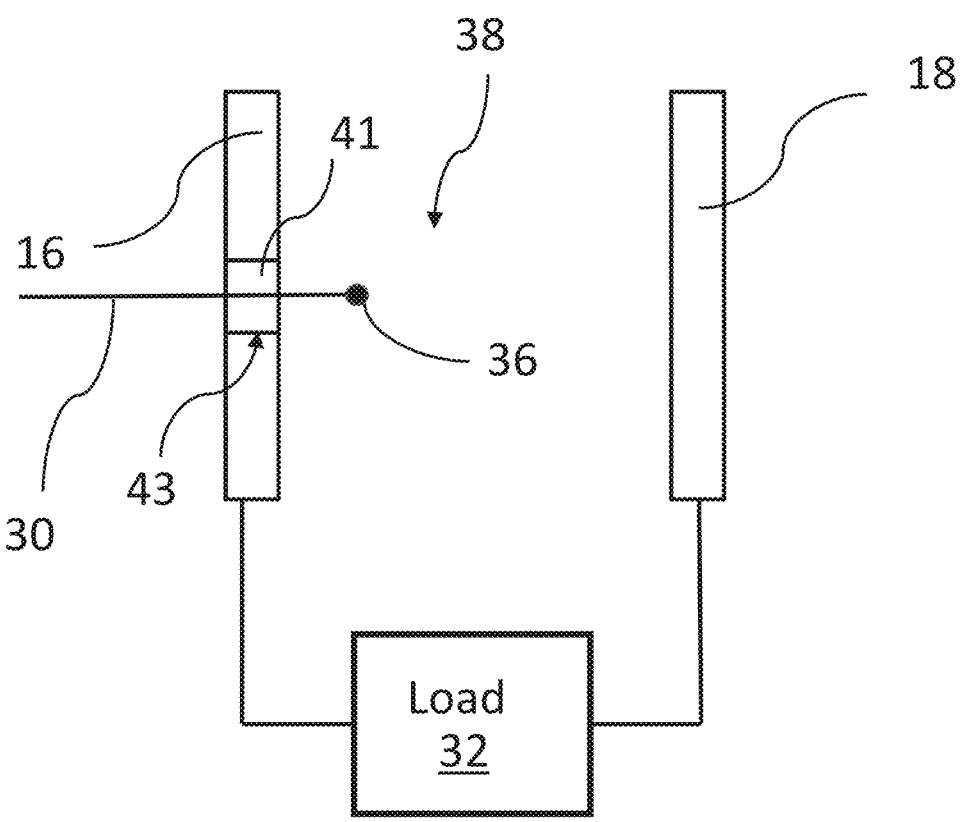
FIG. 7C is a block diagram of a pulse signal being applied to an electrode inserted sli into a gap through a feedthrough in the cathode of the thermionic energy converter of FIG. 1.

As shown in FIG. 7C, in some other embodiments the electrode 36 is provided as a pin or wire or the like that is inserted slightly into the gap 38 through a feedthrough 43 in the cathode 16. In various embodiments the feedthrough 43 suitably is made from the insulating material 41 (described above) in the cathode 16. In such embodiments the pulse 30 is applied to the electrode 36.

Figure 7D:
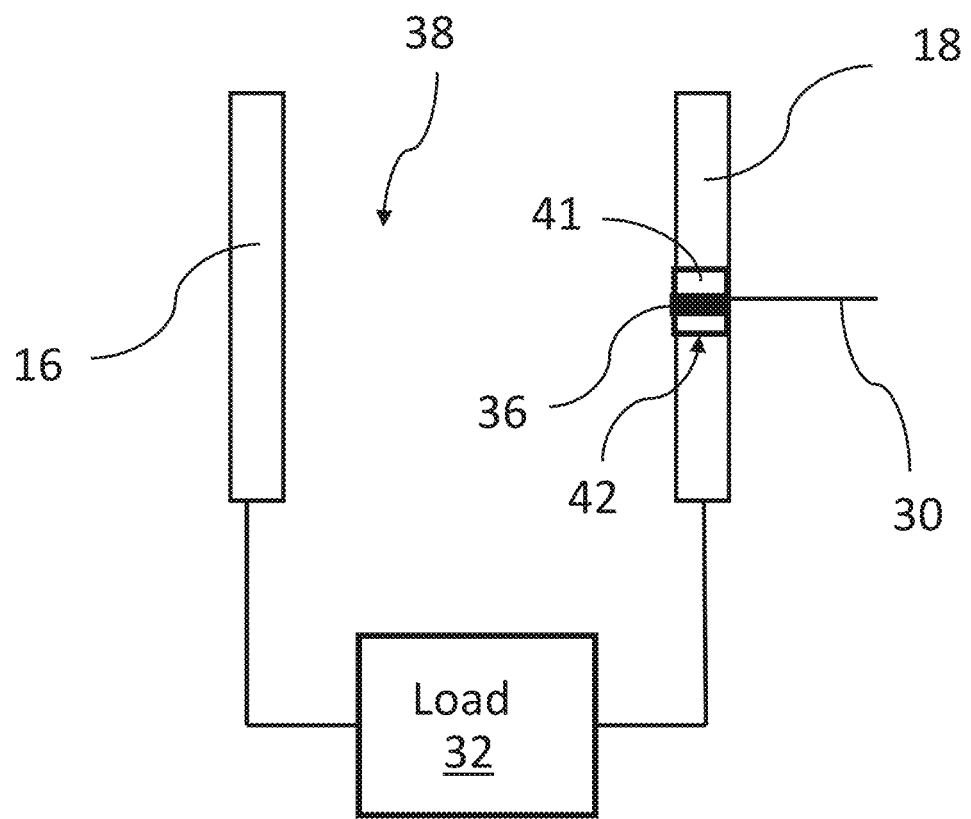
FIG. 7D is a block diagram of a pulse signal being applied to an electrically isolated region of an anode of the thermionic energy converter of FIG. 1.

As shown in FIG. 7D, in some embodiments the electrode 36 is formed within an electrically isolated region 42 of the anode 18. In the electrically isolated region 42 the electrode 36 is electrically isolated from the rest of the anode 18 with the insulating material 41 (described above) such that the electrode 36 is electrically isolated from the anode 18. In such embodiments the pulse 30 is applied to the electrode 36.

Figure 7E:
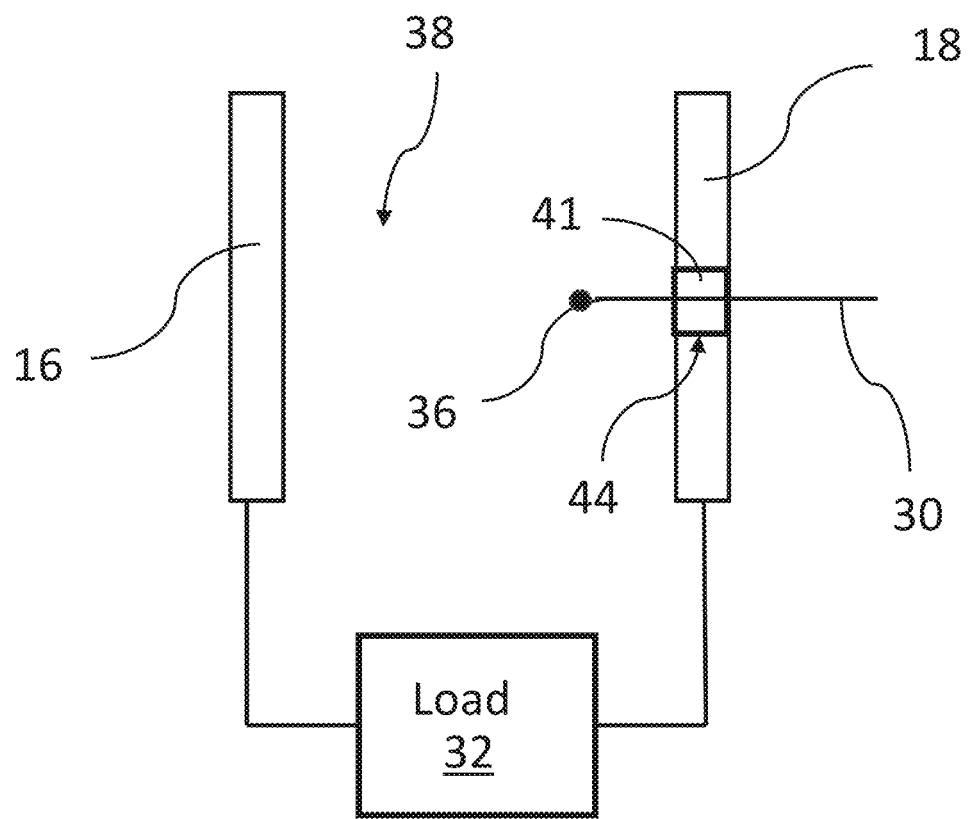
FIG. 7E is a block diagram of a pulse signal being applied to an electrode inserted slightly into a gap through a feedthrough in the anode of the thermionic energy converter of FIG. 1.

As shown in FIG. 7E, in some other embodiments the electrode 36 is provided as a pin or wire or the like that is inserted slightly into the gap 38 through a feedthrough 44 in the anode 18. In various embodiments the feedthrough 44 suitably is made from the insulating material 41 (described above) in the anode 18. In such embodiments the pulse 30 is applied to the electrode 36.

Applying the pulses 30 to the separate electrode 36 also allows for longer duration pulses 30 than in a two-electrode device. This can help contribute to making for simpler and less expensive pulsing electronics 20. Furthermore, the separate electrode 36 can either be pulsed positively to accelerate electrons towards it, or it can be designed to emit electrons (for example, by heating it for thermionic emission) and then pulsed negatively to accelerate the emitted electrons into the gap 38. Depending on the specific design and properties of the thermionic energy converter 10 and the electronic circuitry 20, one of the electrodes 36 may provide for higher-efficiency or higher-power operation.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A thermionic energy converter comprising:
   a hermetic package charged with a non-cesium gas additive including a non-noble molecular gas, the non-noble molecular gas including at least one of $SF_6$ or $XeF_6$, the hermetic package being configured to route into the hermetic package pulses for igniting plasma in the hermetic package;
   a cesium reservoir disposed in the hermetic package;
   a cathode disposed in the hermetic package; and
   an anode disposed in the hermetic package.

2. The thermionic energy converter of claim 1, wherein the non-noble, molecular gas includes gas properties that are selected to reduce at least one parameter chosen from electron-neutral scattering, cesium ion mobility, and heat conduction.

3. The thermionic energy converter of claim 1, wherein the cathode includes at least one material chosen from cesiated polycrystalline, single crystal molybdenum, highly oriented molybdenum, tungsten, platinum, iridium, and nickel.

4. The thermionic energy converter of claim 1, wherein the cathode includes a cathode chosen from an impregnated barium dispenser cathode, a barium oxide cathode, and a scandate cathode.

5. The thermionic energy converter of claim 1, wherein the anode includes at least one material chosen from nickel, copper, and stainless steel.

6. The thermionic energy converter of claim 1, further comprising an additional electrode in addition to the cathode and the anode.

7. The thermionic energy converter of claim 6, wherein the additional electrode is disposed in a gap between the cathode and the anode.

8. The thermionic energy converter of claim 7, wherein the additional electrode is disposed in the gap between the cathode and the anode in a feedthrough through an electrode chosen from the cathode and the anode.

9. The thermionic energy converter of claim 6, wherein the additional electrode is defined in an electrically isolated portion of an electrode chosen from the cathode and anode.

10. The thermionic energy converter of claim 1, further comprising electrical wiring electrically couplable to the hermetic package and to a source of pulses for igniting plasma in the hermetic package, the electrical wiring being configured to reduce parasitic inductance.

11. The thermionic energy converter of claim 1, wherein the hermetic package includes a transformer disposed therein, the transformer being configured to transform pulses having a first voltage and a first current to pulses having a second voltage that is lower than the first voltage and a second current that is higher than the first current.

12. A thermionic energy converter comprising:
a hermetic package charged with a non-cesium gas additive including a non-noble molecular gas, wherein the non-noble molecular gas includes at least one of $SF_6$ or $XeF_6$;
a cesium reservoir disposed in the hermetic package;
a cathode disposed in the hermetic package;
an anode disposed in the hermetic package; and
electronic circuitry configured to generate pulses for igniting plasma in the hermetic package.

13. The thermionic energy converter of claim 12, wherein the non-noble, molecular gas includes gas properties that are selected to reduce at least one parameter chosen from electron-neutral scattering, cesium ion mobility, and heat conduction.

14. The thermionic energy converter of claim 12, wherein the cathode includes at least one material chosen from cesiated polycrystalline, single crystal molybdenum, highly oriented molybdenum, tungsten, platinum, iridium, and nickel.

15. The thermionic energy converter of claim 12, wherein the cathode includes a cathode chosen from an impregnated barium dispenser cathode, a barium oxide cathode, and a scandate cathode.

16. The thermionic energy converter of claim 12, wherein the anode includes at least one material chosen from nickel, copper, and stainless steel.

17. The thermionic energy converter of claim 12, further comprising an additional electrode in addition to the cathode and anode, the additional electrode being electrically connected to receive the pulses from the electrical circuitry.

18. The thermionic energy converter of claim 17, wherein the additional electrode is disposed in a gap between the cathode and the anode.

19. The thermionic energy converter of claim 18, wherein the additional electrode is disposed in the gap between the cathode and the anode in a feedthrough through an electrode chosen from the cathode and the anode.

20. The thermionic energy converter of claim 17, wherein the additional electrode is defined in an electrically isolated portion of an electrode chosen from the cathode and anode.

21. A thermionic energy converter comprising:
a hermetic package charged with a non-cesium gas additive;
a cesium reservoir disposed in the hermetic package;
a cathode disposed in the hermetic package;
an anode disposed in the hermetic package; and
electronic circuitry configured to generate pulses for igniting plasma in the hermetic package, wherein the pulses include a first voltage selected to ionize the cesium.

22. A thermionic energy converter comprising:
a hermetic package charged with a non-cesium gas additive;
a cesium reservoir disposed in the hermetic package;
a cathode disposed in the hermetic package;
an anode disposed in the hermetic package; and
electronic circuitry configured to generate pulses for igniting plasma in the hermetic package, wherein the pulses include s a second voltage selected to ionize the cesium and the non-cesium gas additive.

23. A thermionic energy converter comprising:
a hermetic package charged with a non-cesium gas additive;
a cesium reservoir disposed in the hermetic package;
a cathode disposed in the hermetic package,
an anode disposed in the hermetic package; and
electronic circuitry configured to generate pulses for igniting plasma in the hermetic package,
wherein an electrode chosen from the cathode and the anode is electrically switchable between the pulses and a load.

24. A thermionic energy converter comprising:
a hermetic package charged with a non-cesium gas additive;
a cesium reservoir disposed in the hermetic package;
a cathode disposed in the hermetic package;
an anode disposed in the hermetic package, and
electronic circuitry configured to generate pulses for igniting plasma in the hermetic package, and having a pulse width less than 1 microsecond.

25. The thermionic energy converter of claim 24, wherein the electronic circuitry is further configured to generate pulses having a pulse width less than 500 nanoseconds.

26. The thermionic energy converter of claim 25, wherein the electronic circuitry is further configured to generate pulses having a pulse width less than 300 nanoseconds.

27. The thermionic energy converter of claim 26, wherein the electronic circuitry is further configured to generate pulses having a pulse width less than 150 nanoseconds.

28. The thermionic energy converter of claim 27, wherein the electronic circuitry is further configured to generate pulses having a pulse width less than 100 nanoseconds.

* * * * *

UNITED STATES PATENT AND TRADEMARK OFFICE
CERTIFICATE OF CORRECTION

| | | |
|---|---|---|
| PATENT NO. | : 12,081,145 B2 | |
| APPLICATION NO. | : 17/065132 | |
| DATED | : September 3, 2024 | |
| INVENTOR(S) | : Stephen E. Clark et al. | |

It is certified that error appears in the above-identified patent and that said Letters Patent is hereby corrected as shown below:

In the Specification

In Column 2, Line 60, delete "plasma" and insert -- plasma. --.

In Column 3, Line 18, delete "sli" and insert -- slightly --.

In Column 3, Line 22, delete "FIG. 1," and insert -- FIG. 1. --.

In Column 7, Lines 50-51, delete "powerpulsein and ignitionpulsein" and insert -- power_pulsein and ignition_pulsein --.

In the Claims

In Column 12, Line 31, in Claim 22, delete "s a" and insert -- a --.

In Column 12, Line 51, in Claim 24, delete "package," and insert -- package --.

Signed and Sealed this
Twelfth Day of November, 2024

Katherine Kelly Vidal
*Director of the United States Patent and Trademark Office*